Patented Nov. 29, 1932

1,889,429

UNITED STATES PATENT OFFICE

WILLIAM B. WIEGAND, OF SOUTH BEACH, CONNECTICUT, AND LOUIS J. VENUTO, OF NEW YORK, N. Y.

CARBON BLACK AND PROCESS OF MAKING SAME

No Drawing.     Application filed December 2, 1927. Serial No. 237,330.

The important characteristics of carbon black which render it particularly valuable in the manufacture of rubber compositions, phonograph records, various wax and resin compositions, printers ink and other preparations, are its extremely fine state of subdivision together with the very essential property of being readily and uniformly dispersed in rubber, waxes, oils and the like. Carbon black, as manufactured, is such a very light fine powder that normally ten pounds, or less, occupy a package of one cubic foot. It is accordingly expensive to pack, ship and store such a light bulky material, and handling the light powder causes it to fly in the air to such an extent that there is substantial loss of material, and an annoyance to workmen handling the material and breathing the dust.

Numerous attempts have been made to overcome these objectionable properties of carbon black and render it denser and less dusty, but all such attempts heretofore have greatly changed the very essential physical properties of the carbon black which make it industrially valuable. Thus, the carbon black may be made into a paste with water or other volatile liquid such as gasoline, solvent naphtha, xylene, turpentine, carbon tetrachloride and the like, and the volatile liquid then distilled or evaporated, but the resulting cake is hard, the carbon particles tend to hold together in chunks, and they no longer disperse readily and uniformly as for example in rubber compositions. Apparently the state of aggregation of the carbon particles has been changed in such altered carbon blacks, and, as a matter of fact, the industrially essential physical properties, namely, easy and uniform dispersion, are so much impaired that such processes have never been a commercial success.

We find that when the original carbon black is added to a liquid to form a paste and the liquid slowly distilled or evaporated, such treatment causes changes which are associated with a free meniscus, i. e. vortices, surface tension adhesion, settling, volume contraction of the black, and a very persistent adhesion of particle to particle. The result is the clumping together of the carbon and the loss of dispersibility, as referred to above. This change of colloidal properties or loss of dispersibility may be mitigated or avoided by drying very quickly with violent agitation, drying by quickly removing the liquid by absorbing it into the walls of a small porous container, or by displacing the original liquid by another in such a manner as to avoid free suspension of the particles, in a liquid phase.

The main object of our invention is to secure carbon black having the desired dispersive properties, greater density, freedom from dust, freedom from gritty particles, less absorbed or occluded gases, reduced oil absorption than the ordinary powder form, and capable of considerable handling without crushing or dusting.

We have discovered that we can improve carbon black as to all or substantially all of the above mentioned properties without deleteriously affecting any of the properties essential to its satisfactory industrial use, such as softness and dispersive qualities, and by a process which includes the simultaneous or successive treatment of the carbon black with two immiscible liquids, the second liquid having greater attraction for or greater ability to wet the particles.

This process, if carried out under certain conditions, causes the carbon black to form into pellets which are hard enough to stand any ordinary shipment or handling without dusting, flying or breaking down, and which at the same time are easily crushed by moderate pressure, as between the fingers or by the pressures commonly employed in the rolls of rubber compounding machinery, printers ink mixers and the like. The crushed particles have substantially their original softness and the material disperses freely without leaving any particles of undispersed carbon in the material.

While the pellet form is a very convenient form of the carbon black, the shape of the particles is not the most important characteristic of this novel carbon black. The properties enumerated above may be incorporated into the black in the form of flakes or the pellets or flakes may be crushed and pressed into blocks without seriously affecting its valuable dispersive properties.

In carrying out the process we mix the carbon black with one liquid and add a second liquid which is substantially immiscible with the first and which has greater ability to wet the carbon particles. The mixture is then agitated until the first mentioned liquid is practically free from carbon. This liquid is then separated and the other liquid is removed by evaporation.

Merely as an example of our improved process, the operation may be carried out as follows:

The carbon black is first mixed with water so as to form a comparatively thin paste with most of the occluded gases driven out. After thorough mixing gasoline is added and the whole mass thoroughly agitated. As a result substantially all of the carbon black floats on top of the water in the form of pellets and may be readily removed by filtering, decanting or the like. These pellets may then be dried to remove the absorbed gasoline and such moisture as there may be contained therein. Care should be taken to insure the complete wetting of the particles with the water, as otherwise the particles will be wet directly by the gasoline and in drying harsh particles may result. In the drying operation the carbon black retains its globular, ball-like or pellet form.

On the first addition of gasoline to the black and water paste, with agitation, the mass seems to thicken like an emulsion; then on further shaking, it seems to flocculate into granules; as the agitation goes on, a slight creaming to the top of the pellets or a scum takes place, then gradually the pellets form and float to the top. The end point is reached when the water below is free of carbon-clear.

The pellets are then screened off by any of the various methods, placed in an oven or a recovery apparatus and freed from solvent and water. It has been found that by use of this method the drying has little or no harmful effect upon the particle. Low temperature drying, and high temperature drying (around 400° Fahrenheit) leave the particle in a good soft condition. There are however various factors which will influence this.

If there is no organic residue decomposed by heat, there will be no binding of the particle. If there is, a harshness will result due to the decomposition or gumming of the residue. If too much gasoline is used, the particles will compact to comparatively hard pellets. If there is too much water and not enough gasoline, an inferior product will result.

The control however of the above process does not necessarily have to be delicate. A rather wide margin of safety exists.

Merely as an example of the relative proportions which we have found to operate satisfactorily, we give the following by weight:

| | Parts |
|---|---|
| Carbon | 5 |
| Water | 40 to 80 |
| Gasoline | 7 to 9 |

In carrying out our improved process with these proportions, the mass may be thoroughly shaken or otherwise agitated for about five minutes and the resulting pellets will be of about one-sixteenth of an inch in diameter and will be fairly uniform in size.

The pellets are very porous, of substantially spherical or globular form, have a smooth somewhat lustrous outer surface which is not easily broken by handling, are more compact than untreated carbon, are fragile under light pressure, and may be easily reduced to soft minute particles which cannot be told from the original particles except that possibly they have a more unctuous feel. They somewhat resemble lead shot and may be rolled in the hand without dirtying or dusting. Apparently the outer surface portion or shell of each pellet is slightly more compact than the inner part, but still porous.

In shipping or storing, we find that approximately twice the number of pounds of these pellets can be placed in a container of a given size than is the case with the untreated carbon black. Thus, expense is reduced for shipment or storage.

It will be noted that during the agitation and separation any grit which there may be in the carbon black may settle to the bottom, while the pellets float to the top and thus the purification of the carbon black will be effected at the same time the pellets are formed.

The pellets will not pack down in the bottom of a bag or other shipping container as in the case with untreated black and may be stored in bins and delivered through chutes to the point of use, without caking or sticking. The non-flying properties permit better control of the mixing in rubber or other composition, facilitate weighing, result in a substantial saving of material by eliminating mechanical loss, and add to the comfort of the operator.

The process of the present invention when carried out as described above yields substantially pure carbon black, but we find that the present invention can be employed for the manufacture of carbon black containing other materials uniformly distributed through or absorbed by the black, without loss of dispersibility. For example in its application in the rubber industry, it has been attempted to incorporate various other substances with the black, such as accelerators, softeners and anti-oxidants. When this is done by adding the said additional substance and the carbon black to a liquid in which the added ingredient is soluble, and subsequently evaporating or distilling the liquid, the resulting carbon black is hard and has lost its ready dispersibility, as noted above. We find that the addition of substantial proportions of certain other substances to either of the liquids used in the process of the present invention does not impair the dispersibility of the resulting carbon black. Thus for example hexamethylene tetramine and various water soluble xanthates may be added to the water containing the carbon black or such substances as diphenyl-guanidine, thiocarbanilide, various amine oleates or stearates, or anti-oxidants, such as hydroquinone, resorcinol or naphthylamine may be added to the gasoline, benzol or water insoluble phase up to the limit of their respective solubilities, without impairing the qualities of the resulting carbon black.

There are various factors which enter into the process and these may be varied to get the pellets harder or softer or larger or smaller. Among these factors are the thickness of the paste, the amount of gasoline used, the adding of the gasoline in bulk or a little at a time, speed of agitation, temperature, type of gasoline used, and character of the carbon black. In using gasoline, it is desirable to use a high grade, such for instance that commonly known as aviation gasoline, in which there is a minimum amount of high boiling constituents. Other liquids, such as benzol, chloroform, toluol, carbon tetrachloride, xylol, turpentine, or carbon di-sulphide, may be used. It is important that the liquid used be one which is as nearly completely immiscible with water as possible.

Using an agent, such as carbon tetrachloride, chloroform, carbon di-sulphide, or any other of like character having a specific gravity of over one, will not cause the flotation of the pellets to the top of the water, but they will simply sink to the bottom. They can however be recovered by filtration or screening.

Some creaming agents have greater wetting power than gasoline, and therefore require a lesser amount to bring about the end point.

In general it is preferable that the creaming agent be completely volatile so as to leave the carbon pure. In special cases it is not necessary where the residue will impart special properties to the pellet.

If small pellets are desired, a lesser amount of gasoline or other liquid should be used in respect to the amount of water and carbon, and greater agitation should be employed. To secure large pellets, we use a larger amount of gasoline and slower agitation. In practice, we do not consider a size larger than one-quarter of an inch desirable. There are many kinds, grades or varieties of carbon black and often identification of the particular kind or grade is difficult. With our improved process the different kinds or grades may be made into pellets of different sizes so that identification is facilitated, for instance, very small pellets may be made for printers ink and larger ones for rubber, etc.

It is possible also to reduce the flying of the black by not carrying the above treatment to its ultimate pellet stage. It will come out as an amorphous mass somewhat flaky and fluffy, and must be separated from the mixture by filtration.

The flake form of the material is produced by incorporating the black in water, as described above, and immersing in the mixture a porous material which is wet with gasoline, or other liquid as before described. Owing to the preferential wetting power of the gasoline, the carbon particles leave the water and are wetted by the gasoline, building up a layer instead of forming globules or pellets as is the case when the agitation method is used. The surface on which the black is deposited may be a rotating porous cylinder, with the gasoline supplied to the inside, the layer of black being continuously scraped off the cylinder, as it rotates.

Another method of producing the flake form is to crush the pellets before evaporating the solvent, as between rolls, and then evaporating the gasoline, or other volatile liquid.

The whole process of pellet formation depends upon the selective wetting power which the various solvents exert on the carbon black.

We use the term "carbon black" in its broad rather than limited meaning, and by such term include lamp black, gas black and other black analogous carbon substances for use as pigments or fillers.

We find that the present invention can be applied to other fine powders whose industrial applications depend upon their dispersibility. For example, precipitated magnesium carbonate, zinc oxide, titanium oxide, barium sulfate, and certain talcs and clays are difficult to disperse in rubber or oil on account of absorbed air and tendency to fly as dust, and we find that these powders can be manufactured in denser form, with elimination of most of the absorbed air and without loss of dispersibility, by the process of the present invention.

We have obtained very satisfactory pellets from magnesium carbonate and also from zinc oxide by use of the process exactly as described above although benzol has been used instead of gasoline.

In the foregoing we have referred to agitation of the mixture, but we do not wish to be restricted to any particular kind of agitating apparatus. For batch operation the agitation may be accomplished by violent shaking, rotating or tumbling of the container, and for continuous operation the agitation may be by any means which will impart rapid changes in the direction and/or velocity of the flow of the mixture stream, as for instance, apertured obstructions or baffles in a conduit.

Having thus described our invention, what we claim as new and desire to secure by Letters Patent is:

1. Sustantially pure carbon black in the form of commercially uniform, comparatively small, rounded, smooth aggregates having a spongy porous interior.

2. As an article of manufacture, a pellet of approximately one-sixteenth of an inch in diameter and formed of a porous mass of substantially pure carbon black.

3. A carbon black pellet formed of soft particles, the outer surface of the pellet being smooth and the outer portion being slightly denser than the inner portion.

4. The process of treating carbon black which includes the steps of mixing the carbon black with a liquid to form a very thin paste, adding a second liquid in smaller amount and which is immiscible with the first liquid, agitating, separating the carbon black and second liquid from the first liquid, and then separating the carbon black and the second liquid.

5. The method which includes wetting carbon black with water, bringing the mixture into contact with a liquid having greater wetting properties whereby the carbon black is substantially separated from the water, and evaporating the second liquid from the carbon black to leave aggregates of porous fragile structure readily reducible to the original state of fine subdivision.

6. A process of treating carbon black which consists in agitating it in the presence of two immiscible liquids and having dissolved or incorporated in one or the other of said liquids, accelerators, softeners, antioxidants or other useful ingredients, whereby the carbon black forms pellets in or with one of said liquids absorbing during this process, the accelerators, softeners, anti-oxidants or other useful ingredient from one or the other of said liquids.

7. The process which includes wetting carbon black with water, bringing it and gasoline into contact under conditions causing the gasoline to displace substantially all of the water from the carbon black, removing the carbon black mass wetted with the gasoline, and evaporating the gasoline.

8. The following process, mixing 40 to 80 parts of water and 5 parts of carbon black to form a thin paste, adding 7 to 9 parts of gasoline, agitating until the carbon black forms in pellets in the gasoline and leaves the water substantially clear, separating the pellets and the water, and drying the pellets.

9. The process of treating compounding materials in a fine state of subdivision to bring them into a more compact form for use in plastic and coating composition which consists in wetting it with one liquid in which the finely divided material is substantially insoluble and with which it does not react chemically, subsequently agitating it with a second similarly inactive liquid immiscible with the first and having greater wetting properties, separating the material from the first liquid, and drying to obtain the material in a more compact form.

10. The process of treating carbon black, which consists in wetting it with one liquid in which the finely divided material is substantially insoluble and with which it does not coact chemically, subsequently agitating it with a second similarly inactive liquid immiscible with the first and having greater wetting properties, separating the carbon black from the first liquid and drying to obtain the carbon black in more compact form.

Signed at New York, in the county of New York and State of New York, this 30 day of November 1927.

WILLIAM B. WIEGAND.
LOUIS J. VENUTO.